June 13, 1967  P. C. NELSON  3,324,653
POWER DRIVEN TOOL

Filed Sept. 1, 1965  3 Sheets-Sheet 1

INVENTOR.
Paul C. Nelson

ATTORNEYS

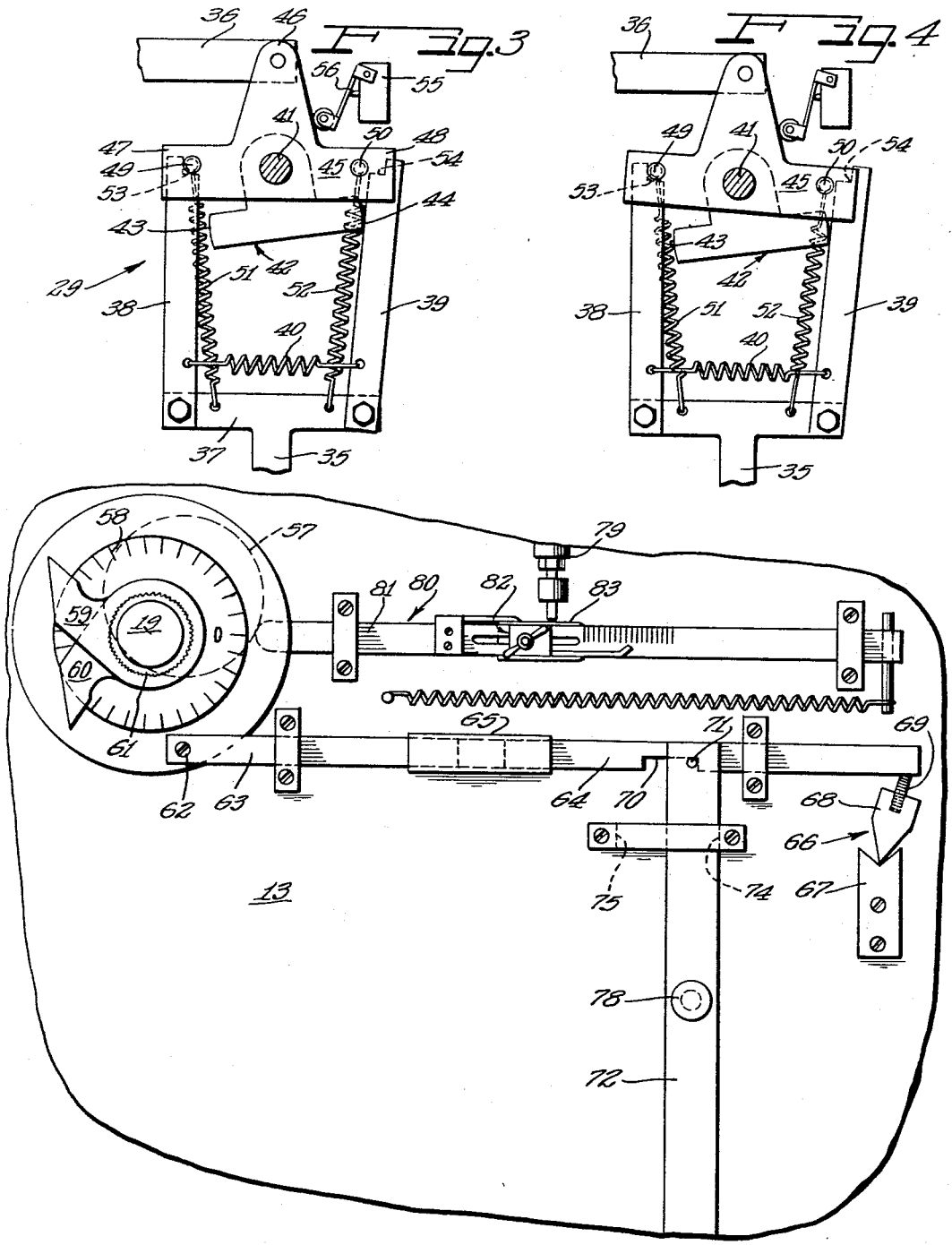

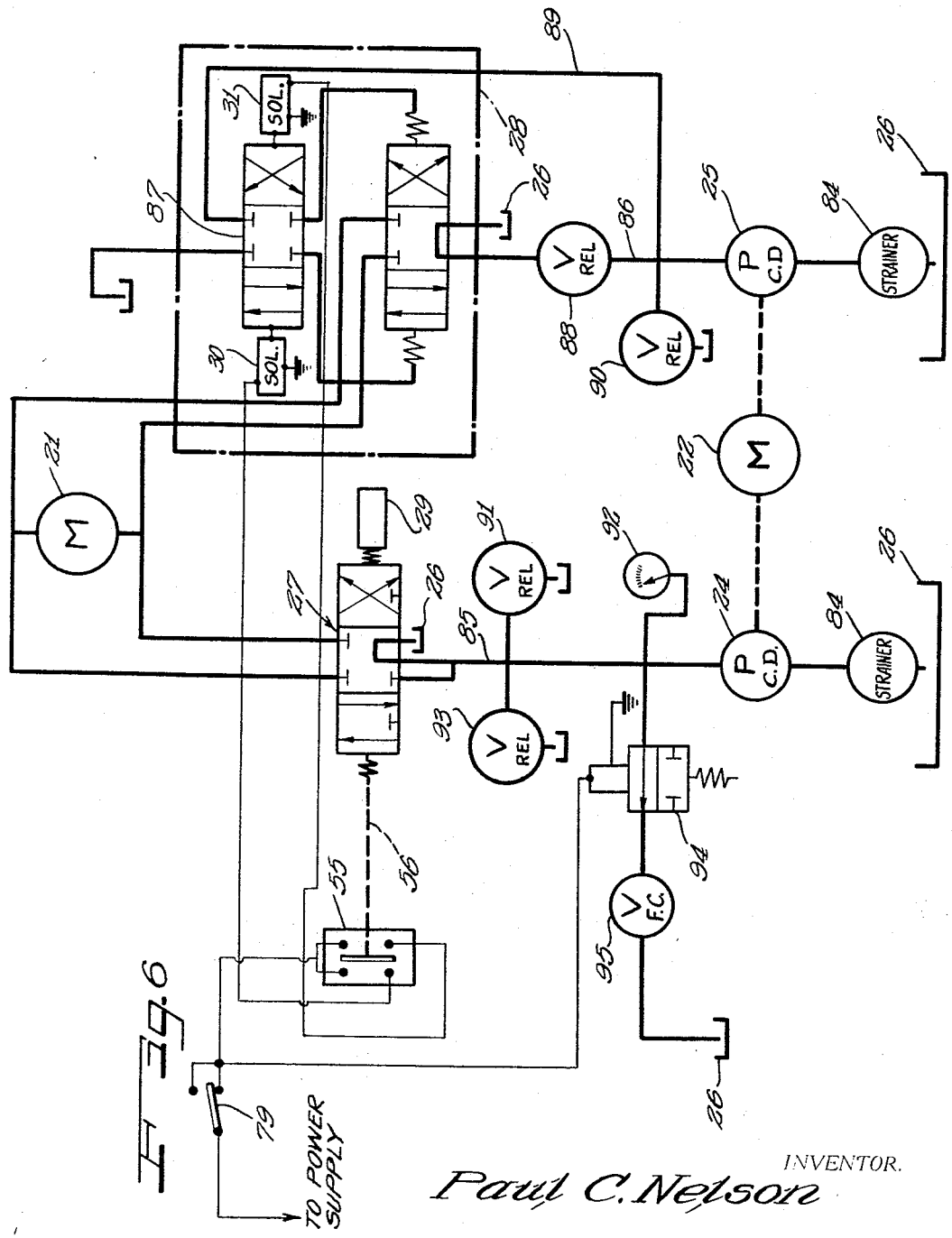

United States Patent Office 3,324,653
Patented June 13, 1967

3,324,653
POWER DRIVEN TOOL
Paul C. Nelson, Lake City, Minn., assignor to Houdaille Industries, Inc., Buffalo, N.Y., a corporation of Michigan
Filed Sept. 1, 1965, Ser. No. 484,400
9 Claims. (Cl. 60—53)

This invention relates generally to power-driven tools, and more specifically to the means for driving and controlling a movable tool support.

A particularly useful application is made in a press-brake. Heretofore, the movable tool support of a press-brake has been vertically reciprocated by one or two hydraulic displacement motors provided with pressurized fluid from a single hydraulic pump. Various structures have been provided to reduce the speed of advance of the tool support as it nears the end of the working or power stroke, after which the higher advancing speed was restored for retraction. Such prior structures have been characterized by a combination of features and components which, taken together, have been of such combined cost as to preclude certain potential purchasers of such a machine from being able to buy the same.

In accordance with the principles of the present invention, controlled means for reciprocating the tool support is provided which includes a novel combination and arrangement of elements which will obtain the results of prior devices, and comprising a set of components and features which can be furnished more economically than prior structures.

Accordingly, it is an object of the present invention to provide a power-driven tool embodying a combination of components for controlled reciprocation of a tool support, which combination of elements enables a lower selling price for a machine tool of the same capacity.

Another object of the present invention is to provide a novel combination of elements for reciprocating a movable tool support in a machine tool.

Many other features and additional objects of the present invention will become manifest to those versed in the art upon making reference to the detailed description and the accompanying drawings in which a preferred structural embodiment incorporating the principles of the present invention is shown by way of illustrative example.

On the drawings:

FIG. 3 is a side elevational view of a mechanism employed in FIG. 1, the same being illustrated in a centered position;

FIG. 4 illustrates the mechanism of FIG. 3, showing the same displaced in one direction;

FIG. 5 is an enlarged fragmentary view showing in elevation the structure located at the upper end of the right side of the machine shown in FIG. 1; and FIG. 6 is a schematic diagram of the hydraulic components employed in the machine of FIG. 1, including certain mechanical and electrical relationships therebetween.

As shown on the drawings:

Figure 1:
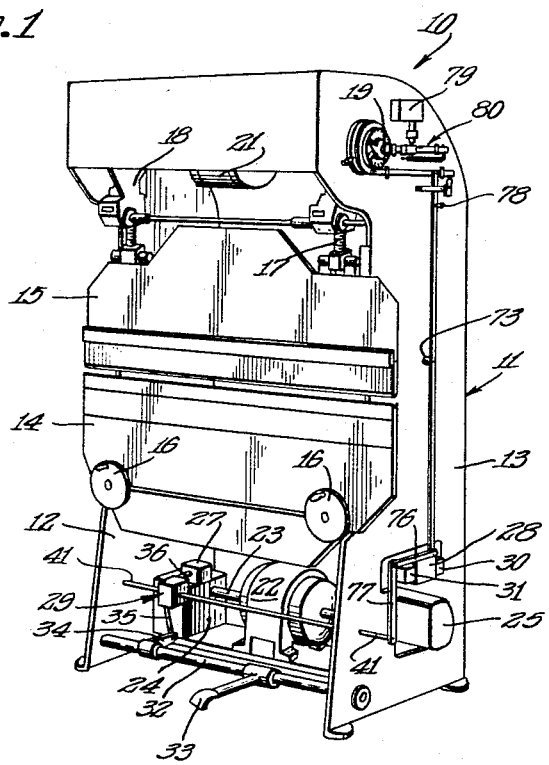
FIG. 1 is a perspective view of a power-driven press-brake constructed in accordance with the principles of the present invention.

The principles of this invention are particularly useful when embodied in a power-driven tool such as a press-brake illustrated in FIG. 1, generally indicated by the numeral 10. The press brake 10 includes a rigid frame generally indicated at 11 having a left side plate 12 and a right side plate 13 joined together by known means (not illustrated). The frame 11 supports a lower tool support 14 and an upper tool support 15. The position of back gaging (not shown) may be adjusted through either of two cranks 16 acting through known means. The upper tool support 15 is reciprocably supported, and is hence referred to herein as being a movable tool support.

Figure 2:
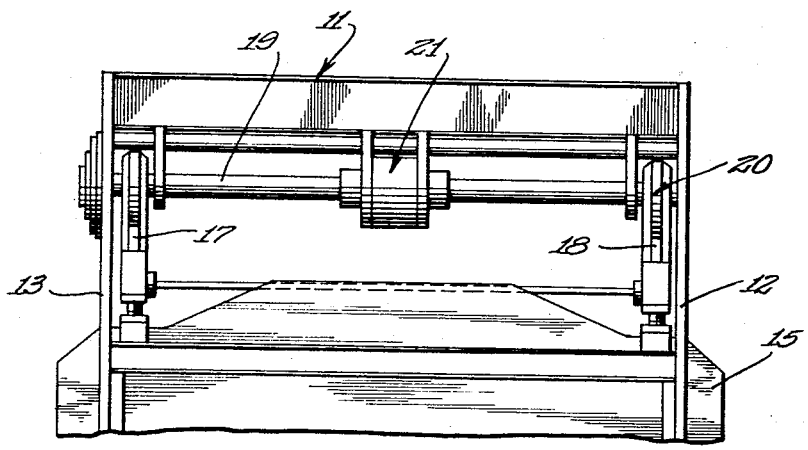
FIG. 2 is an enlarged elevational view of the upper part of the machine shown in FIG. 1 as viewed from the rear.

As best seen in FIG. 2, the upper or movable tool support 15 is supported near its ends by a pair of connecting rods 17, 18 which are each carried on an eccentric (not shown) secured to an operating shaft 19 for corotation. Upon rotation of the shaft 19, the movable tool support 15 is reciprocated. The shaft 19, together with the connecting rods 17 and 18, are referred to herein collectively as actuating means, generally indicated by the numeral 20. The shaft 19 is rotatably supported on the frame 11. Also supported on the frame 11 is a hydraulic displacement motor 21 of a known type having two compartments separated by a movable member or vane (not shown). The movable member is corotatably secured to the shaft 19, so that upon operation of the motor 21, the movable tool support 15 is reciprocated. In this invention, only a single hydraulic displacement motor 21 is employed.

As best seen in FIG. 1, the power to operate the hydraulic motor 21 is derived from an electric motor 22 which has an operating shaft 23 projecting from both ends thereof. At one end, the shaft 23 is connected to a first hydraulic pump 24, shown somewhat diagrammatically, and at its other end, the shaft 23 is connected to a second hydraulic pump 25. The pumps 24 and 25 are of the constant delivery type, and the electric motor 22 drives the pumps 24 and 25 continuously. Both of the pumps 24 and 25 withdraw hydraulic fluid from a common tank or sump 26 (FIG. 6) and both of the pumps 24 and 25 discharge the same under pressure to the hydraulic displacement motor 21, both of the pumps 24 and 25 discharging at the same time into the same compartment of such motor 21. The flow of fluid from the hydraulic pump 24 is under the control of a 4-way valve 27, rather diagrammatically shown in FIG. 1, while the hydraulic fluid discharged by the hydraulic pump 25 is under the control of a 4-way valve 28. The 4-way valve 27 includes a conventional spool which is mechanically positioned by selectively actuatable means generally indicated at 29, and shown somewhat diagrammatically in FIG. 1 for convenience of illustration. The 4-way valve 28 is electrically controlled, and to that end includes a pair of solenoids 30, 31.

The selectively actuatable means 29 includes a shaft 32 which is rotatably supported at its end by the frame 11. An actuating pedal 33 is corotatably secured thereto, and may be positioned along the length of the shaft 32 to a convenient position. The pedal 33 is biased in an upward direction so that the same may be depressed by the foot of the operator to lower the same, to rock the shaft 32, and to thereby raise an arm 34, also secured to the shaft 32. Movement of the outer end of the arm 34 in an upward direction actuates or raises a connecting member or link 35, so as through the means 29 to shift a link 36 in a longitudinal manner in either direction from a centered position. The link 36 is connected to the spool of the 4-way valve 27 so that when the link 36 moves the spool inwardly, one compartment of the motor 21 is pressurized, and so that when the link 36 moves the spool of the 4-way valve 27 in the opposite direction, the other compartment of the hydraulic motor 21 is pressurized.

The mechanical details employed for translating upward movements of the link 35 into movements of the link 36 which are directed in either direction from a centered position are shown in FIG. 3. The upper end of the actuating link 35 has a cross arm 37. At each end of the cross arm 37, there is pivotally supported an upwardly extending trip dog 38, 39 respectively. These are biased toward each other by a trip spring 40. A control shaft 41 is rotatably supported near its ends by the frame 13 (FIG. 1) and extends between the upper ends of the trip dogs 38, 39. Corotatably secured thereto is a trip dog spacer 42 having one end 43 directed toward the trip dog 38, and an opposite end 44 directed toward and shown in engagement with the trip dog 39. The trip dog spacer 42 is corotatable with the control shaft 41, and slight rocking of the control shaft 41 urges one end or the other into engagement with one or the other trip dog 38, 39. Rotatably carried on the control shaft 41 is a double bell crank 45 having an upwardly extending arm 46 pivotally connected to the valve spool link 36, having an arm 47 extending to the left, and having an arm 48 extending to the right as shown. Near the upper end of the trip dog 38, the arm 47 has a transversely extending pin 49, while the arm 48 has a transversely extending pin 50 near the upper end of the trip dog 39. The double bell crank 45 is a mechanism which is displaceable in either direction from the illustrated centered position, such centered position being maintained by a pair of springs such as exemplified by the centering springs 51, 52. The spring 51 is shown as acting between the upper end of the link 35 and the pin 49, while the centering spring 52 is shown as acting between the upper end of the link 35 and the pin 50. The springs 51, 52 are of sufficient strength so that if the mechanism or bell crank 45 is not restrained, it will be moved by such springs 51, 52 to the illustrated centered position, thereby also acting through the link 36 to center the spool of the 4-way valve 27.

The upper end of the link 38 is provided with a notch 53 which opens upwardly and toward the center, while the upper end of the trip dog 39 is provided with a corresponding notch 54 which likewise opens upwardly and to the center, for respectively receiving the pins 49 and 50. For the position of the trip dog spacer 42 illustrated, the spring 40 urges the trip dog 38 to the right so that the pin 49 is received in the notch 53. For this position of the trip dog spacer 42, the trip spring 40 urges the trip dog 39 against the end 44 of the trip dog spacer, which spacer holds the notch 54 outwardly clear to the pin 50. When an upward movement is applied to the link 35, as by actuating the pedal 33, the left trip dog 38 acts at its notch 53 to raise the pin 49, thereby rocking the bell crank 45 in a clockwise direction about the axis of the control shaft 41, thereby drawing the valve spool link 36 to the right, and thereby also lowering the pin 50 along the inner side of the trip dog 39, all of which is illustrated in FIG. 4. This movement is against the force of the centering spring 51 as shown in FIG. 4. As the travel of the motor is being completed, a mechanism described hereafter causes the control shaft 41 to rotate in a clockwise direction, thereby urging the end 43 against the inner side of the trip dog 38 to enable the pin 49 to slip out of the notch 53, thereby enabling the centering spring 51 to restore the centered position of the parts biased thereby. The trip dog spacer 42 remains in a position to the left, thus enabling the notch 54 to slip under the pin 50 as soon as the crank arm 45 has been centered, and the link 35 lowered by the release of the pedal 33. The mechanism 29 is now ready for reactuation, and the next time, the bell crank mechanism 45 will be rocked in the opposite direction by the trip dog 39.

A selector switch 55 has an actuator 56 which has a centered position determined by the bell crank mechanism 45, and when the bell crank mechanism is rocked in either direction from such centered position, the actuator 56 is likewise rocked in corresponding directions from its centered position to close one set or an opposite set of contacts described below.

The mechanism by which motor rotation rocks the trip dog spacer is shown in FIGS. 5 and 1. The actuating shaft 19, driven by the hydraulic displacement motor 21, projects through the plate 13, and carries in a fixed manner on its outboard end a cam 57 and a scale plate 58. Also carried on such projecting end is a pair of stop arms 59, 60 which are adjustably secured thereto by a nut 61. When the nut 61 is loose, each of the arms 59, 60 may be angularly adjusted about the axis of the shaft 19. The scale plate 58 has graduations extending from either side of a "zero" reference mark, such zero reference mark being in the position illustrated when the hydraulic displacement motor 21 is at its center position, thereby corresponding to the lowermost position of the movable tool support 15. Upon loosening of the nut 61, each of the stop arms 59 and 60 is set to terminate upward travel of the movable tool support at a selected position by means of the following structure.

A pin 62 is carried by a slide bar section 63 which is normally comovable with a slide bar section 64, the slide bar sections 63 and 64 being connected together by a safety sleeve 65, and being slidably supported on the side plate 13. An over-center mechanism 66 acts on the remote end of the slide bar section 64, and includes a V-block 67, a knife-edge block 68, and a biasing spring 69. When the slide bar 63, 64 is moved to the left, the spring 69 is compressed until it passes center, and upon doing so, the over-center mechanism 66 positively assists such movement of the slide bar to a limiting position. The slide bar section 64 has a notch 70 which defines confronting stop faces against which a pin 71 engages. The pin 71 is fixedly carried by the upper end of a control lever 72 which is pivoted at 73 for rocking movement from the illustrated position against a stop 74 to a position of engagement with a stop 75. Forward movement of the control bar 72 causes its lower end to move rearwardly, thereby shifting a control link 76 rearwardly to rock a control arm 77 in a clockwise direction, thereby pivoting the control shaft 41 to rock the trip dog spacer to recenter the spool of the 4-day valve 27 as described before.

When the shaft 19 rotates in a clockwise direction as shown in FIG. 5, the stop face on the stop arm 59 likewise moves in a clockwise direction to engage the right side of the pin 62 to shift the slide bar sections 63, 64 to the left as shown to initiate the afore-described stoppage of the hydraulic displacement motor 21. A manual knob 78 is provided on the control bar 72 for manual stoppage thereof at any time. When the shaft 19 is rotating in the opposite direction, the stop arm 60 will shift the slide bar sections 63, 64 from a leftmost position, to the right. The safety sleeve 65 protects the control components against damage in the event of excessive power being applied thereto in some unforeseen manner.

While the selector switch 55 is operative to deliver power to one or the other of the solenoids 30, 31 of the 4-way valve 28, power to such selector switch 55 is controlled by a control switch 79 under the control of driven cam means generally indicated at 80. The driven cam means 80 includes the cam 57 which is operative to reciprocate a cam bar 81 which is slidably supported on the side plate 13. The cam bar 81 supports an adjustable cam block structure 82 which controls the position of the actuator of the control switch 79. The relationship between the cam 57 and the cam bar 81 is such that the cam bar 81 is shifted to the right during tool advancing movement of the actuating shaft 19, and is shifted to the left after the maximum rise of the cam 57 has been reached and passed. The amount of movement of the cam bar 81 is the same as that of the movable tool support. The relationship of the adjustable cam block structure 82 to the cam bar 81 is such that the switch 79 will be opened after the movable tool support 15 has been moved from a fully retracted position to one where it is about to engage the workpiece. Opening of the switch 79 thus interrupts power to the solenoids 30, 31, thereby effecting centering of the 4-way valve 28 so that the hydraulic pump 25 has an output which is diverted from the hydraulic displacement motor 21. This diversion slows down the motor 21 so that the remainder of the advancing stroke of the movable tool support 15 is made at a relatively slow rate. The configuration of the adjustable cam block 82 is such that when the movable tool support reaches its lowermost position, the switch 79 is reclosed, thereby restoring delivery of hydraulic fluid from the hydraulic pump 25 to the same compartment of the displacement motor 21. The switch 79 is open when its actuator during tool advancement is one a level indicated at 83, and the switch 79 is closed when its actuator is on either the higher or the lower adjacent levels. By use of a commercially available ratchet type switch for the switch 79, it remains closed when its actuator is on the level 83 during tool retraction.

The hydraulic circuitry employed is shown in FIG. 6, together with certain control circuitry. The hydraulic pumps 24, 25, being driven by the electric motor 22, withdraw hydraulic fluid from the sump 26, each through a strainer 84. The output of the pump 24 is through a hydraulic line 85, into the 4-way valve 27, and thence to the sump 26. The output of the hydraulic pump 25 is through a hydraulic line 86 to the 4-way valve 28, and thence to the sump 26. When the selectably actuatable means 29 is actuated by means of the foot pedal, the slide of the 4-way valve 27 will be shifted in one of the two directions from its centered position to deliver pressurized hydraulic fluid to the motor 21. Movement of the slide of the 4-way valve 27 also closes the selector switch 55 to effect energizing of the corresponding solenoids 30, 31 of the 4-way valve 28. If desired, the solenoids 30, 31 may be provided on a 4-way pilot valve 87 connected to actuate the 4-way valve 28. Thus the 4-way valve 28, when actuated simultaneously with the 4-way valve 27, coacts therewith to deliver hydraulic fluid to the same compartment of the motor 21. To facilitate the use of the pilot valve 87, an in-line relief valve 88 is employed which is set to crack at a typical pressure of 100 p.s.i. which will appear on a hydraulic line 89 leading to the pilot valve 87 before any fluid is delivered to the main 4-way valve 28.

The motor 21 continues to operate until the driven cam means 80 opens the control switch 79 by placing it in a centered position. Power to the selector switch 55 is thereby interrupted, and hence whichever solenoid 30, 31 is energized becomes deenergized, thereby enabling centering and closing of the 4-way valve 28. On being recentered, the 4-way valve 28 diverts hydraulic fluid to the sump, while the motor 21 continues to be driven by the hydraulic pump 24. After the slow portion of the advancing stroke of the movable tool support 15 has been completed, the driven cam means 80 recloses the control switch 79 to reenergize the same solenoid 30 or 31, thereby enabling the pump 25 to assist the pump 24 in driving the motor 21 to the end of its stroke, which corresponds to the retraction of the movable tool support 15.

To protect the hydraulic pump 25 against possible damage, a relief valve 90, set to a typical pressure of 500 p.s.i., communicates with the hydraulic line 86. To protect the pump 24, a relief valve 91, typically set to 1500 p.s.i., is connected to the hydraulic line 85. A pressure gage 92 is also connected to the hydraulic line 85. Further, a manually adjustable relief valve 93 is also connected to the hydraulic line 85, and typically is set to a pressure of 1000 p.s.i., but preferably is adjustable for the entire range from 0 to 1500 p.s.i. This relief valve serves to limit the maximum force which the motor 21 can deliver to the tool support 15.

If it is desired to reduce further the slow rate of the motor 21, there may also be included an electrically actuated valve means leading from the hydraulic line 85 to the sump 26. In this embodiment, the electrically actuated means includes a 2-way solenoid-actuated valve 94 connected to the line 85, and leading through a manually adjustable flow control valve 95 to the sump 26. The solenoid of the valve 94 is connected to receive its power from the control switch 79, so that the valve 94, when energized, is closed. However, the valve means 94 becomes deenergized by the structure which deenergizes the 4-way valve 28, thereby enabling it to conduct some of the hydraulic fluid from the hydraulic line 85 to divert the same to the sump 26, the quantity that is diverted being adjustable.

Thus by the foregoing circuitry, there is provided an economical means for operating a hydraulic motor at two speeds, to operate a movable tool support, wherein the lower speed is employed during the working portion of the advancing stroke.

Although various minor modifications might be suggested by those versed in the art, it should be understood that I wish to embody within the scope of the patent warranted hereon all such embodiments as reasonably and properly come within the scope of my contribution to the art.

I claim as my invention:

1. In a power-driven tool, the combination comprising:
   (a) a movable tool support;
   (b) actuating means connected to said tool support for reciprocating it from a retracted position, through an extended operating position, and back to said retracted position;
   (c) a hydraulic displacement motor of the rotary actuator type having a rotatable member connected to said actuating means for moving it successively in two directions in response to rotation of said rotatable member in one direction, and having two compartments, one on each side of said rotatable member;
   (d) a pair of hydraulic pumps; and
   (e) selectively controlled means operative to connect both of said pumps to one of said compartments to drive said motor in a first direction, and being responsive to the position of said actuating means to at least partially disconnect one of said pumps from said one compartment during a predetermined portion of the motor's movement in said first direction, said selectively controlled means being further operative to connect both of said pumps to the other of said compartments to drive said motor in an opposite direction, and being responsive to the position of said actuating means to at least partially disconnect one of said pumps from said one compartment during a predetermined portion of the motor's movement in said opposite direction.

2. In a power-driven tool, the combination comprising:
   (a) a movable tool support;
   (b) actuating means connected to said tool support for moving it;
   (c) a hydraulic displacement motor connected to said actuating means for moving it;
   (d) a pair of hydraulic pumps;
   (e) a pair of 4-way valves respectively connecting said pumps to said hydraulic motor;
   (f) electrically operated means controlling one of said 4-way valves;
   (g) selectively actuatable means controlling the other of said 4-way valves;
   (h) a selector switch under the mechanical control of said selectively actuatable means and connected in circuit with said electrically operated means to enable said pumps to drive said hydraulic motor jointly; and
   (i) a control switch operated at a predetermined extent of movement of said actuating means and connected in circuit with said electrically operated means for controlling said one 4-way valve to alter the rate of movement of said hydraulic motor.

3. In a power-driven tool, the combination comprising:
   (a) a movable tool support;
   (b) actuating means connected to said tool support for moving it;
   (c) a hydraulic displacement motor connected to said actuating means for moving it;
   (d) a pair of hydraulic pumps;
   (e) a pair of 4-way valves respectively connecting said pumps to said hydraulic motor;

(f) electrically operated means controlling one of said 4-way valves, and including a pair of solenoids;
(g) a mechanism displaceable in either direction from a normally centered position and connected to and controlling the other of said 4-way valves;
(h) a selector switch having an actuator displaceable by said mechanism in either direction from a centered position, said selector switch being connected electrically to said solenoids by which said solenoids may be separately energized when said mechanism is moved from its center position to enable said pumps to drive said hydraulic motor jointly; and
(i) a control switch operated at a predetermined extent of movement of said actuating means and connected in series with said pair of solenoids to control said one 4-way valve to alter the rate of movement of said hydraulic motor.

4. In a power-driven tool, the combination comprising:
(a) a movable tool support;
(b) actuating means connected to said tool support for moving it;
(c) a hydraulic displacement motor connected to said actuating means for moving it;
(d) a pair of hydraulic pumps;
(e) a pair of 4-way valves respectively connecting said pumps to said hydraulic motor;
(f) electrically operated means controlling one of said 4-way valves;
(g) selectively actuatable means controlling the other of said 4-way valves;
(h) a selector switch under the mechanical control of said selectively actuatable means and connected in circuit with said electrically operated means to enable said pumps to drive said hydraulic motor jointly;
(i) a control switch connected in circuit with said electrically operated means and controlling said one 4-way valve; and
(j) means driven by said hydraulic motor for actuating said control switch during advance of said movable tool support to lower the rate at which said movable tool support is advanced, said driven means also restoring the position of said control switch after said advance of said movable tool support to increase the rate at which said movable tool support is retracted.

5. In a power-driven tool, the combination comprising:
(a) a movable tool support;
(b) actuating means connected to said tool support for reciprocating it from a retracted position, through an extended operating position, and back to a retracted position;
(c) a hydraulic displacement motor of the rotary actuator type having a rotatable member connected to said actuating means for moving it to reciprocate said tool support means through said operating position each time that said rotatable member passes through its center of travel;
(d) a pair of hydraulic pumps; and
(e) selectively controlled means operative to connect both of said pumps to said hydraulic motor to drive said rotatable member in one direction at a first rate, and, during the latter part of the advance of said tool support, to disconnect one of said pumps from said hydraulic motor to enable the other of said pumps to continue alone to drive said rotatable member in said one direction at a lesser rate of movement to complete such advance, said selectively controlled means being thereafter automatically operative to reconnect said one of said pumps to said hydraulic motor to increase the rate of movement of said rotatable member in said one direction for retraction of said tool support.

6. In a power-driven tool, the combination comprising:
(a) a movable tool support;
(b) actuating means connected to said tool support for reciprocating it from a retracted position, through an extended operating position, and back to a retracted position;
(c) a hydraulic displacement motor of the rotary actuator type having a rotatable member connected to said actuating means for moving it to reciprocate said tool support means through said operating position each time that said rotatable member passes through its center of travel;
(d) a pair of hydraulic pumps;
(e) a first 4-way valve connecting one of said pumps directly to both sides of said motor, and a second 4-way valve connecting the other of said pumps directly to both sides of said motor;
(f) selectably actuable means controlling said 4-way valves;
(g) electrically actuated valve means connected to divert hydraulic fluid from the output of one of said pumps; and
(h) a control switch operated at a predetermined extent of movement of said actuating means and connected in circuit electrically with said electrically actuated valve means.

7. In a power-driven tool, the combination comprising:
(a) a movable tool support;
(b) actuating means connected to said tool support for moving it;
(c) a hydraulic displacement motor connected to said actuating means for moving it;
(d) a pair of hydraulic pumps;
(e) a pair of 4-way valves respectively connecting said pumps to said hydraulic motor;
(f) selectably actuable means controlling said 4-way valves;
(g) an electrically actuable pilot valve controlling one of said 4-way valves for diverting hydraulic fluid from the output of one of said pumps; and
(h) a control switch operated at a predetermined extent of movement of said actuating means and connected in circuit with said electrically actuatable pilot valve.

8. In a power-driven tool, the combination comprising:
(a) a movable tool support;
(b) actuating means connected to said tool support for moving it;
(c) a hydraulic displacement motor connected to said actuating means for moving it;
(d) a pair of hydraulic pumps;
(e) a pair of 4-way valves respectively connecting said pumps to said hydraulic motor;
(f) selectably actuable means controlling said 4-way valves;
(g) electrically actuated valve means connected to divert hydraulic fluid from the output of one of said pumps;
(h) a manually adjustable flow control valve in fluid series with said valve means; and
(i) a control switch operated at a predetermined extent of movement of said actuating means and connected in circuit electrically with said electrically actuated valve means.

9. In a power-driven tool, the combination comprising:
(a) a movable tool support;
(b) actuating means connected to said tool support for moving it;
(c) a single hydraulic displacement motor having a movable member connected to said actuating means for moving it, and having two compartments, one on each side of said movable member;
(d) an electric motor;
(e) a pair of hydraulic pumps of the constant delivery type connected to said electric motor to be jointly driven thereby;
(f) a pair of 4-way valves connecting both of said pumps to one of said compartments to drive said motor in a first direction and in an opposite direction;

(g) electrically operated means controlling one of said 4-way valves, and including a pair of solenoids;

(h) a mechanism displaceable in either direction from a normally centered position and connected to and controlling the other of said 4-way valves;

(i) a selector switch having an actuator displaceable by said mechanism in either direction from a centered position, said selector switch being connected electrically to said solenoids by which said solenoids may be separately energized when said mechanism is moved from its center position to enable said pumps to drive said hydraulic motor jointly;

(j) a control switch connected in series with said pair of solenoids to control said one 4-way valve; and (k) cam means driven by said actuating means for actuating said control switch during advance of said movable tool support to lower the rate at which said movable tool support is advanced, said driven cam means also restoring the position of said control switch after said advance of said movable tool support to increase the rate at which said movable tool support is retracted.

References Cited
UNITED STATES PATENTS

| | | | |
|---|---|---|---|
| 2,051,052 | 8/1936 | Morgan | 60—52 |
| 2,518,782 | 8/1950 | Hipp | 60—52 |
| 2,875,733 | 3/1959 | Nelson | 60—52 X |
| 3,172,240 | 3/1965 | Giardini et al. | 60—52 |

FOREIGN PATENTS 357,406  9/1931  Great Britain.

EDGAR W. GEOGHEGAN, *Primary Examiner.*